United States Patent [19]
Tanaka

[11] Patent Number: 5,203,821
[45] Date of Patent: Apr. 20, 1993

[54] MALFUNCTION DETECTOR FOR ACCELERATION SENSOR

[75] Inventor: Hirohisa Tanaka, Hyogo, Japan

[73] Assignee: Sumitomo Electric Industries, Ltd., Osaka, Japan

[21] Appl. No.: 813,760

[22] Filed: Dec. 23, 1991

Related U.S. Application Data

[63] Continuation-in-part of Ser. No. 583,642, Sep. 17, 1990, abandoned.

[30] Foreign Application Priority Data

Aug. 21, 1989 [JP] Japan .................. 1-245843

[51] Int. Cl.[5] .......................................... G01M 15/00
[52] U.S. Cl. ...................................................... 73/1 D
[58] Field of Search ............... 73/1 D, 2, 118.1, 121, 73/129; 303/92; 364/426.02

[56] References Cited

U.S. PATENT DOCUMENTS

| | | | |
|---|---|---|---|
| 3,015,946 | 1/1962 | Moore | 73/1 D |
| 3,224,245 | 12/1965 | Alibrandi et al. | 73/1 D |
| 3,295,355 | 1/1967 | Fisher et al. | 73/1 D |
| 3,953,080 | 4/1976 | Bremer | 303/92 |
| 3,964,796 | 6/1976 | Bremer | 303/92 |
| 4,841,446 | 6/1989 | Lieber et al. | 303/92 |
| 4,895,021 | 1/1990 | Ishizeki | 73/118.1 |
| 4,943,922 | 7/1990 | Tanaka | 364/426.02 |

FOREIGN PATENT DOCUMENTS 0069668 3/1990 Japan ........................ 73/2

Primary Examiner—Robert Raevis
Attorney, Agent, or Firm—Wenderoth, Lind & Ponack

[57] ABSTRACT

An apparatus detects a malfunction of a plurality of acceleration sensors used in an antilock control system. The device has a plurality of state changeover devices corresponding to the respective acceleration sensors for changing their outputs from 0 to 1 if the outputs of the respective acceleration sensors change from low deceleration states to high deceleration states, and from 1 to 0 if their outputs change from high to low deceleration states. The apparatus also includes a reset signal output device for producing a reset signal if the outputs of all the state changeover devices are 1 and if the outputs of all of the state changeover devices change from 1 to 0 thereafter. A lamp actuating device is provided for turning a warning lamp on if the output of at least one of the state changeover devices is 1 and for turning the lamp off if there is a reset signal from the reset signal output device.

1 Claim, 3 Drawing Sheets

MALFUNCTION DETECTOR FOR ACCELERATION SENSOR

CROSS-REFERENCE TO RELATED APPLICATIONS

This application is a continuation-in-part of U.S. Pat. application Ser. No. 07/583,642, filed Set. 17, 1990, and now abandoned.

BACKGROUND OF THE INVENTION

1. Field of the Invention

This invention relates to a malfunction detector for an acceleration sensor provided in an antilock control system of a vehicle.

2. Description of the Related Art

The deceleration of a vehicle while its wheels are in a locked state represents the frictional coefficient of the road surface (hereinafter denoted $\mu$), provided the road surface is uniform. Thus, by providing an antilock control system with an acceleration sensor, it becomes possible to judge whether the vehicle is travelling on a road surface having a high-$\mu$ value or one having a low-$\mu$ value. This in turn makes it possible to change over the control mode in such a manner so as to increase the locking detecting sensitivity or to increase the sensitivity for detecting the recovery from a locked state while the vehicle is on a low-$\mu$ road, thus reducing the brake pressure to a greater degree, and to lower such a detecting sensitivity while on a high-$\mu$ road, thus reducing the brake pressure to a lesser degree.

In addition to the above method, various proposals have been made to change the processing level of antilock control, depending upon the ON and OFF positions of an acceleration sensor. For example, it was proposed to re-increase the brake pressure after pressure reduction while on a high-$\mu$ road and slowly while on a low-$\mu$ road, or to control the rate of change of the estimated vehicle speed.

Such acceleration sensors come in various structures. FIG. 2 shows on example which includes a switch body 1 and a glass tube 2 fixedly mounted in the switch body 1 at an angle $\beta$ with respect to the mounting surface M. If a deceleration larger than tan $\beta$ acts while the vehicle is moving in the direction of the depicted arrow (i.e. parallel to the mounting surface), mercury 3 in the glass tube 2 moves toward electrodes 4, electrically connecting the electrodes 4 together. While the electrodes 4 are electrically connected, a deceleration which is larger than a predetermined level is present. If the electrodes 4 are not so connected, then no such deceleration is present.

In contrast, electrodes may be provided at the lower end of the glass tube 2 so that an electrical connection will be cut off while a deceleration which is larger than a predetermined level is present. Another type of acceleration sensor has rolling elements adapted to roll when subjected to deceleration to actuate a limit switch.

If such acceleration sensors should fail, it becomes impossible to change the control level of the antilock control system. This poses a problem in that the braking distance increases.

To prevent this problem, it was proposed to provide a plurality of acceleration sensors and to carry out control for a high-$\mu$ road according to one of two methods: (1) if one of the acceleration sensors indicates a high deceleration, or (2) only if all of the acceleration sensors show a high deceleration.

However, the first method has a drawback in that if the mass in one of the acceleration sensors should get stuck at the high deceleration side, the antilock control performance on a low-$\mu$ road will drop because the control mode is fixed to that for a high-$\mu$ road.

Further, the second method has a drawback in that if the mass in any one of the sensors should get stuck at the low deceleration side, the braking distance tends to increase while on a high-$\mu$ road, because the control mode is fixed to one for a low-$\mu$ road.

Further, even if no mass becomes stuck within the sensors, if the sensitivity of the acceleration sensors should shift for some reason, the same problems as described above will result.

It is an ordinary practice to provide an antilock device with a plurality of acceleration sensors, if provided at all, for safety's sake. In one conventional method for testing whether or not these acceleration sensors are working normally, it is checked whether the acceleration sensor outputs have changed over after inclining the vehicle by an angle at which the outputs are supposed to change over.

However, this method suffers a drawback in that it requires a plurality of audio-visual means for indicating the output states of the respective acceleration sensors.

SUMMARY OF THE INVENTION

It is an object of the present invention to provide a device which can easily detect malfunctions of an acceleration sensor.

In accordance with the present invention, there is provided a malfunction detector for acceleration sensors which includes a testing device for testing the acceleration sensors, a changeover device for selectively supplying the output signals from the acceleration sensors to a processing/lock state detecting device or to the testing device, and a warning device connected to the testing device. The testing device is adapted, upon receipt of the output signals from the acceleration sensors, to change the position of the acceleration sensors from their normal position to a position for a high deceleration to check whether or not all of the acceleration sensors provide high-deceleration signals and then to move the acceleration sensors back to the normal position to check whether or not the output signals from all of the acceleration sensors change from high-deceleration signals to low-deceleration signals and to output the results to the warning device.

According to the present invention, the acceleration sensors are tilted to artificially create a state where a high deceleration is detected and a state where a low deceleration is detected to check whether or not the output signals from all the acceleration sensors correspond to the abovementioned state. This makes it possible to accurately determine whether or not the acceleration sensors are working normally.

According to this invention, there is provided a test mode changeover device and the acceleration sensor testing device. During the test mode, a high deceleration state and a low deceleration state are created artificially to securely check whether or not the acceleration sensors are working normally and to activate the warning lamp when appropriate.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENT

Figure 1:
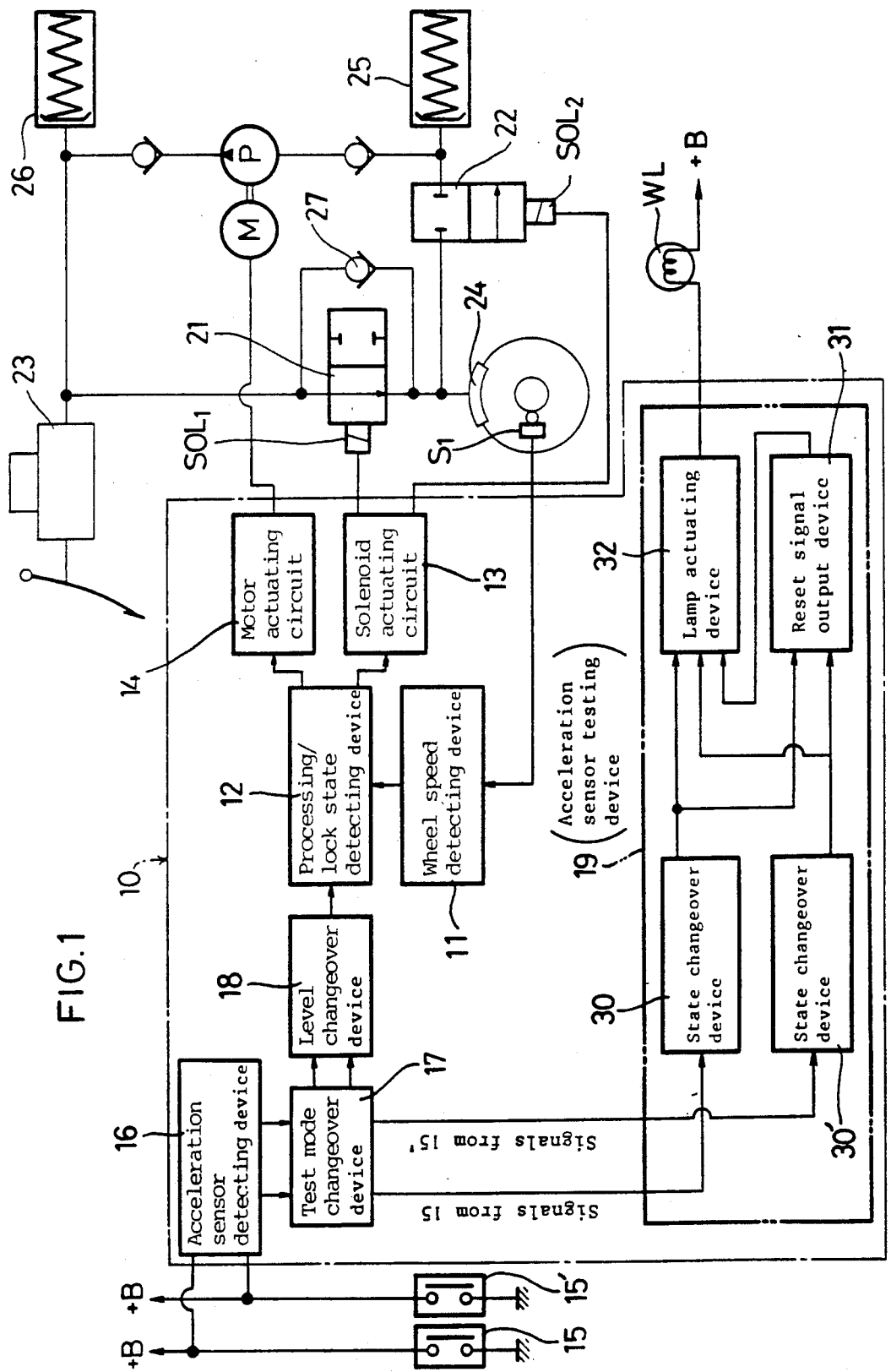
FIG. 1 is a diagrammatic view of the antilock control system provided with the malfunction detector according to this invention.
Figure 2:
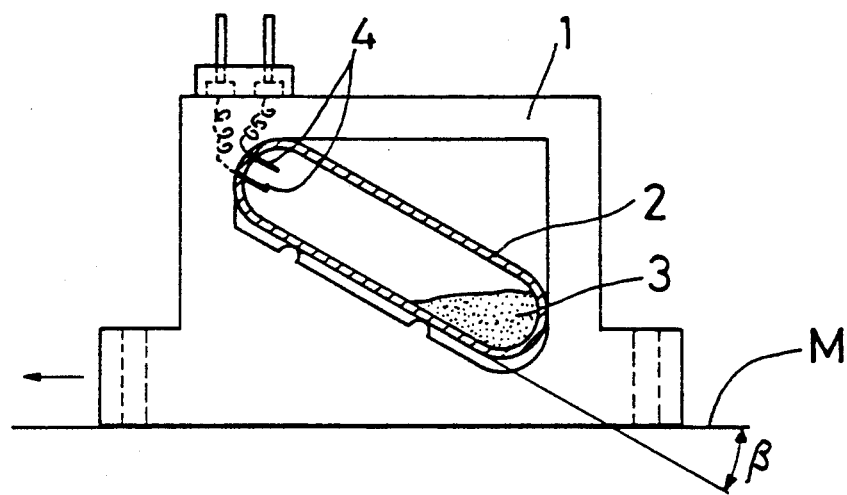
FIG. 2 is a sectional view of an acceleration sensor.

Referring to FIG. 1, an electronic control unit 10 carries out various calculations and judgments based on signals from wheel speed sensors S1-S4 (only S1 is shown) associated respectively with the vehicle wheels and outputs control signals to a fluid pressure circuit.

The AC voltage signals from the wheel speed sensor S1 are converted into pulses and fed from a wheel speed detecting device 11 (which counts the pulses) to a processing/lock state detecting device 12 as wheel speed signals. Based on the deceleration and estimated vehicle speed calculated in the device 12, it is determined whether or not the deceleration has decreased below a reference value or whether the slip speed (the difference between the estimated vehicle speed and the wheel speed) has increased above a reference point. If such a locking tendency is detected, a pressure reduction command is output to a solenoid actuating circuit 13. In response, the circuit 13 energizes solenoids SOL1 and SOL2. Thus, a pressure control valve 21 will be moved (to the lefthand side of FIG. 1), shutting off the fluid pressure circuit extending from a master cylinder 23 to a wheel cylinder 24, and a pressure control valve 22 will move (upwardly in FIG. 1), opening communication between the wheel cylinder 24 and a reservoir 25. At the same time, a motor M is started by a motor actuating circuit 14 to return the brake fluid in the reservoir 25 into an accumulator 26 and the master cylinder 23 by means of a pump P. The brake pressure will thus drop.

When the wheel speed begins to increase again and the deceleration or the slip speed exceeds a reference value, it is judged that the locking tendency has disappeared. Thus, the lock state detecting device 12 outputs a pressure increase command to the solenoid actuating circuit 13, which in response deenergizes the solenoids SOL1 and SOL2 to move the pressure control valves 21 and 22 back to their original positions shown in FIG. 1. Thus, the fluid pressure source and the fluid pressure circuit of the wheel cylinder 24 will communicate with each other and the brake pressure will rise.

When pressure hold command is given to interrupt the pressure reduction or pressure increase command, the solenoid SOL1 is energized and the solenoid SOL2 is deenergized. Thus, the pressure control valve 21 moves (to the lefthand side of FIG. 1), shutting off the fluid pressure circuit, whereas the pressure control valve 22 remains in the position shown in FIG. 1. Thus, fluid pressure is sealed in the wheel cylinder 24 and the brake pressure is kept constant. In FIG. 1, numeral 27 designates a bypass valve.

The conditions and timing for interrupting the pressure reduction command with the pressure hold command may be determined in any desired manner. For example, a pressure hold command may be given when the duration of the pressure reduction command reaches a predetermined point or when the wheel deceleration exceeds a predetermined threshold value.

Similarly, the conditions and timing for alternately giving pressure increase commands and pressure hold commands may be determined in various manners. Generally, pressure hold commands are given at predetermined time intervals by use of a pulse generator, for example.

The judgment as to whether or not a locking tendency has appeared or disappeared may be made based on the deceleration, slip speed or any other index. In FIG. 1, one fluid pressure circuit for controlling one wheel cylinder 24 is shown coupled to the control device. However, it is to be understood that the control device is used to control three channels for the front left wheel, front right wheel and both rear wheels, or four channels for the respective four wheels.

The ON/OFF signals of acceleration sensors 15 and 15' are supplied to an acceleration sensor detecting device 16 and then through a test mode changeover device 17 to a level changeover device 18 for antilock processing. The level changeover device 18 sets the control mode to a high-$\mu$ road control mode if either of the acceleration sensors 15 and 15' indicates a high deceleration (ON signal), and to a low-$\mu$ road control mode if both sensors 15 and 15' show a low deceleration (OFF signal). Alternately, the control mode may be switched to the high-$\mu$ road control mode if both of the sensors 15 and 15' indicate a high deceleration, and to the low-$\mu$ road control mode if either of the sensors 15 and 15' indicates a low deceleration.

Thus, the processing level changeover device 18 serves to change the processing level of the processing-/lock state detecting device 12 depending upon whether the vehicle is travelling on a high-$\mu$ road or a low-$\mu$ road.

While on a high-$\mu$ road, it is common to raise the reference value (threshold value) of the deceleration or slip speed for detecting the locking state or to carry out pressure re-increase soon after pressure reduction.

On the other hand, while on a low-$\mu$ road, the threshold value for detecting the locking state is lowered to raise the detecting sensitivity, whereas the threshold value for detecting the tendency to recover from a locked state is raised to carry out a pressure re-increase slowly after the locking tendency has complete disappeared.

By selectively setting a manual switch or a test terminal, the test mode changeover device 17 establishes a non-test mode in which signals from the acceleration sensor detecting device 16 are applied to the processing level changeover device 18, or a test mode in which the signals from the acceleration sensor detecting device 16 are applied to an acceleration sensor testing device 19.

Figure 3:
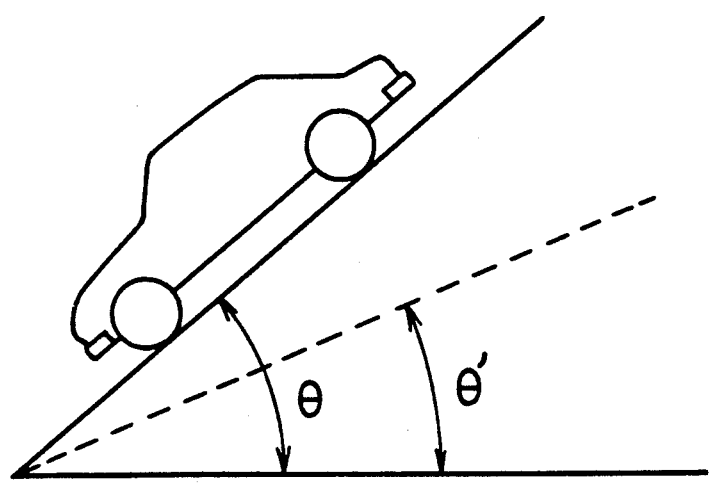
FIG. 3 is an explanatory view depicting relative tilt angles of an automobile having an acceleration sensor housed therein.
Figure 4:
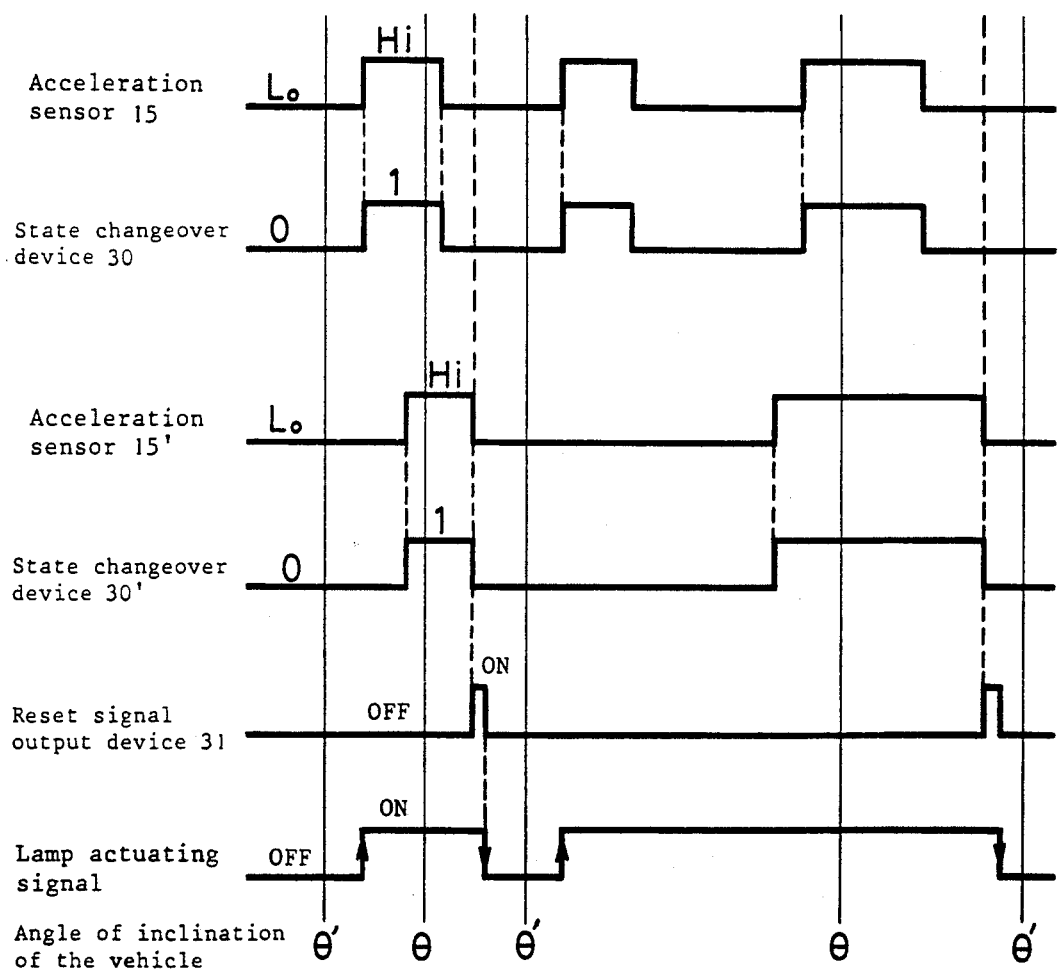
FIG. 4 is a timing chart for explaining the operation of the present invention.

The testing device 19 comprises state changeover devices 30 and 30' to which the signals from the acceleration sensors 15 and 15' are applied, respectively, and a reset signal output device 31. Suppose that the initial setting of the acceleration sensors 15 and 15' is such that their output will change from low deceleration states to high ones when the inclination of the vehicle is between $\Theta$ and $\Theta'$ (FIG. 3). If the outputs of both the acceleration sensors 15 and 15' change from low to high deceleration states when the vehicle is tilted from its horizontal state and its angle of inclination reaches between Θ and Θ', the outputs of both the state changeover devices 30 and 30' will change from 0 to 1 (FIG. 4). This activates a lamp actuating device 32, thus turning a warning lamp WL on. Then if the outputs of both the acceleration sensors 15 and 15' change normally from high to low deceleration states when the vehicle inclination is returned to below Θ', the outputs of both the state changeover devices 30 and 30' change from 1 to 0. This causes the reset signal output device 31 to produce a reset signal which deactivates the lamp actuating device 32, thus turning the lamp WL off. If the lamp WL does not turn on when the vehicle is tilted until its inclination angle reaches between Θ and Θ' or if the lamp WL does not turn off when the vehicle inclination returns to below Θ', it is judged that at least one of the acceleration sensors is not functioning normally. Thus, according to this invention, malfunction of the acceleration sensors can be detected easily with a single warning lamp. Three or more acceleration sensors may be provided.

I claim:

1. An apparatus for detecting a malfunction of any of a plurality of acceleration sensors used in an antilock control system, each of the acceleration sensors normally operative to output a first signal when a deceleration exceeding a predetermined threshold is present and a second signal when a deceleration of less than the predetermined threshold is present, the antilock control system including locking state processing circuitry for detecting a locking state of vehicle wheels and for outputting brake pressure control commands, said apparatus comprising:

a test means for testing the acceleration sensors;

a changeover means for selectively applying output signals from the acceleration sensors to one of said test means and the locking state processing circuitry; and, a lamp operatively coupled to said test means, wherein said test means includes (1) means for receiving the output signals from the acceleration sensors via said changeover means, (2) a plurality of state changeover means corresponding to said respective acceleration sensors for changing their outputs from 0 to 1 if the outputs of said respective acceleration sensors change from low deceleration state to high deceleration states and from 1 to 0 if the outputs of said respective acceleration sensors change from high to low deceleration states, (3) a reset signal output means for producing a reset signal if the outputs of all of said state changeover means are 1 and if said outputs of all of said state changeover means change from 1 to 0 thereafter, and (4) a lamp actuating means for turning said lamp on if the output of at least one of said state changeover means is 1 and turning said lamp off if there is a reset signal from said reset signal output means.

* * * * *